United States Patent
Bolasna et al.

(10) Patent No.: US 6,574,074 B2
(45) Date of Patent: Jun. 3, 2003

(54) AIR BEARING SURFACE DESIGN FOR INDUCING ROLL-BIAS DURING LOAD/UNLOAD SEQUENCE

(75) Inventors: Sanford A. Bolasna, San Jose, CA (US); Mike Suk, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 125 days.

(21) Appl. No.: 09/761,329

(22) Filed: Jan. 16, 2001

(65) Prior Publication Data

US 2002/0093765 A1 Jul. 18, 2002

(51) Int. Cl.[7] ................................................. G11B 5/60
(52) U.S. Cl. ................ 360/236.2; 360/235.6; 360/235.7; 360/235.8; 360/236.3
(58) Field of Search .................... 360/236.2, 235.6, 360/235.7, 236.3, 235.8

(56) References Cited

U.S. PATENT DOCUMENTS 5,796,551 A    8/1998    Samuelson
5,973,880 A * 10/1999    Hashimoto et al. ...... 360/236.2
6,128,162 A * 10/2000    Kameyama ............... 360/236.2
6,351,345 B1 * 2/2002    Kameyama ............... 360/236.2

* cited by examiner

Primary Examiner—Robert S. Tupper
(74) Attorney, Agent, or Firm—Robert S. Martin; Bracewell & Patterson, L.L.P.

(57) ABSTRACT

One embodiment of a recording head for a disk drive with a load/unload mechanism has an air bearing on one surface. The air bearing comprises a patterned set of three air bearing pads, and at least one deep pocket. The three air bearing pads are spaced apart from each other by the deep pocket, with the largest of the air bearing pads located on the leading edge, and the other pads on the trailing edge. The air bearing pads have unique geometry one of the trailing corners of the air bearing is free of all the air bearing pads. This configuration gives the air bearing superior performance characteristics over prior art designs with load/unload mechanisms, particularly in regard to contact with the disk during loading and unloading sequences.

18 Claims, 2 Drawing Sheets

AIR BEARING SURFACE DESIGN FOR INDUCING ROLL-BIAS DURING LOAD/UNLOAD SEQUENCE

The present patent application is related to the following concurrently filed and co-pending patent applications: Ser. No. 09/764,764, entitled, Magnetic Disk Drive with Offset Load/Unload Tab; and Ser. No. 09/972,043, entitled, Offset Limiter for Reducing Potential of Disk Damage During Unload Sequence in Load/Unload Disk Drive, which are incorporated herein by reference.

BACKGROUND OF THE INVENTION

1. Technical Field

The present invention relates in general to an improved disk drive, and in particular to an improved air bearing design for a transducer in a disk drive.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. Disks are rigid platters that are usually made of aluminum alloy or a mixture of glass and ceramic, and are covered with a magnetic coating. Typically, two or three disks are stacked vertically on a common spindle that is turned by a disk drive motor at several thousand revolutions per minute (rpm).

The only other moving part within a typical HDD is the head stack assembly. Within most HDDs, one magnetic read/write head or slider is associated with each side of each platter and flies just above the platter's surface. Each read/write head is mounted on a suspension to form a head gimbal assembly (HGA). The HGA is then attached to a semi-rigid arm apparatus that supports the entire head flying unit. Several semi-rigid arms may be combined to form a single armature unit.

Each read/write head scans the surface of a disk during a "read" or "write" operation. The head and arm assembly is moved utilizing an actuator that is often a voice coil motor (VCM). The stator of a VCM is mounted to a base plate or casting on which the spindle is also mounted. The base casting is in turn mounted to a frame via a compliant suspension. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop directly over the desired track.

To successfully achieve file performance, the read/write head must fly steadily at a given fly height over the disk with minimal variations. Since the variations in fly height are dependent on the various sensitivities of the fly height to the process parameters as well as the variability of the parameters, a state-of-the-art air bearing surface (ABS) design technology and tight process control are mandatory to minimize such variations. Common dominant process parameters affecting fly height include head-gimbal assembly moments, crown and etch depths.

In the prior art, the disk and carbon overcoat on the slider are subject to extensive wear during start/stop cycles. Recent designs have employed load/unload technology to reduce this problem, where a ramp is provided for each slider/suspension assembly at the inner or outer diameter of the disk where the slider is parked. However, during the loading/unloading sequence, the sliders may still contact the disks. In order to read or write data in the load/unload zone (near the outer radial edges of the disks), the inner diameter corners/edges of the slider must not contact the disk surface. Even for systems that do not write data in the load/unload zone, it is desirable to avoid the inner diameter edges of the slider contacting the disk surface since the slider will need to fly over this zone. Thus, further improvements for disk drive components are needed to enhance performance and reduce the potential for data erasure.

SUMMARY OF THE INVENTION

One embodiment of a recording head for a disk drive with a load/unload mechanism has an air bearing on one surface. The air bearing suitably comprises a patterned set of three air bearing pads, and at least one etch surface. The three air bearing pads are spaced apart from each other, with two of the air bearing pads located on the leading edge, and the other pad on the trailing edge. The air bearing also has an offset pad at one of the trailing corners of the air bearing surface. This configuration gives the air bearing superior performance characteristics over prior art designs with load/unload mechanisms, particularly in regard to contact with the disk during loading and unloading sequences.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DESCRIPTION OF THE PREFERRED EMBODIMENT

Figure 1:
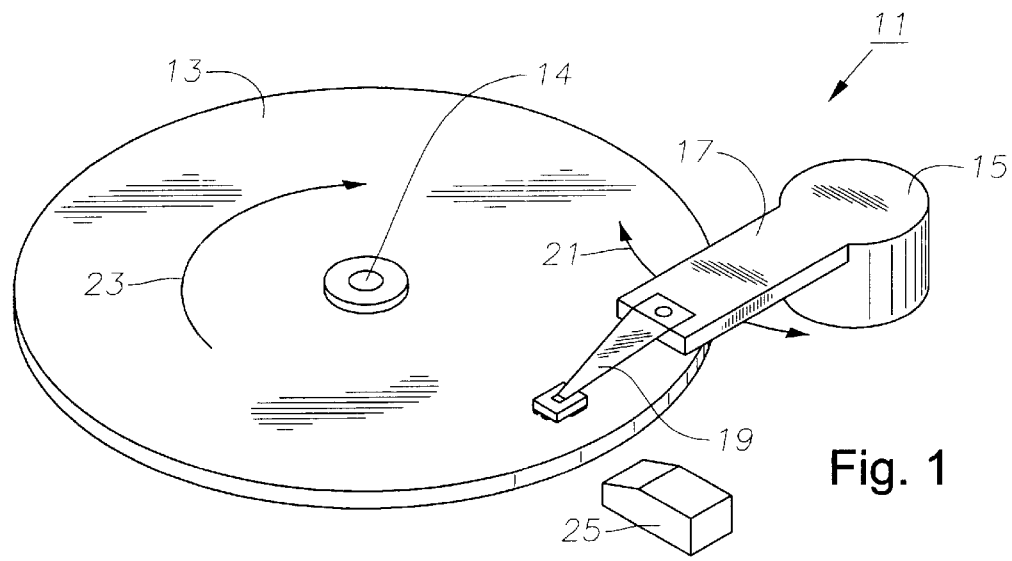
FIG. 1 is a schematic isometric drawing of a disk drive showing a disk and an actuator with a slider assembly having a read/write head or transducer.

Referring to FIG. 1, a disk drive 11 for reading and writing information to the surface of a rotating, magnetic disk 13 having a large plurality of tracks is shown. Disk 13 is mounted on spindle 14, which is attached to a motor (not shown) that is operable to rotate disk 13. Drive 11 comprises an actuator 15 with a movable arm 17 and a suspension 19 on one end. Arm 17 and disk 13 move in the directions indicated by arrows 21, 23, respectively. Arm 17 provides the seek motion when changing tracks on disk 13. A load/unload mechanism, such as ramp 25, is located adjacent to disk 13 for engaging actuator 15.

Figure 2:
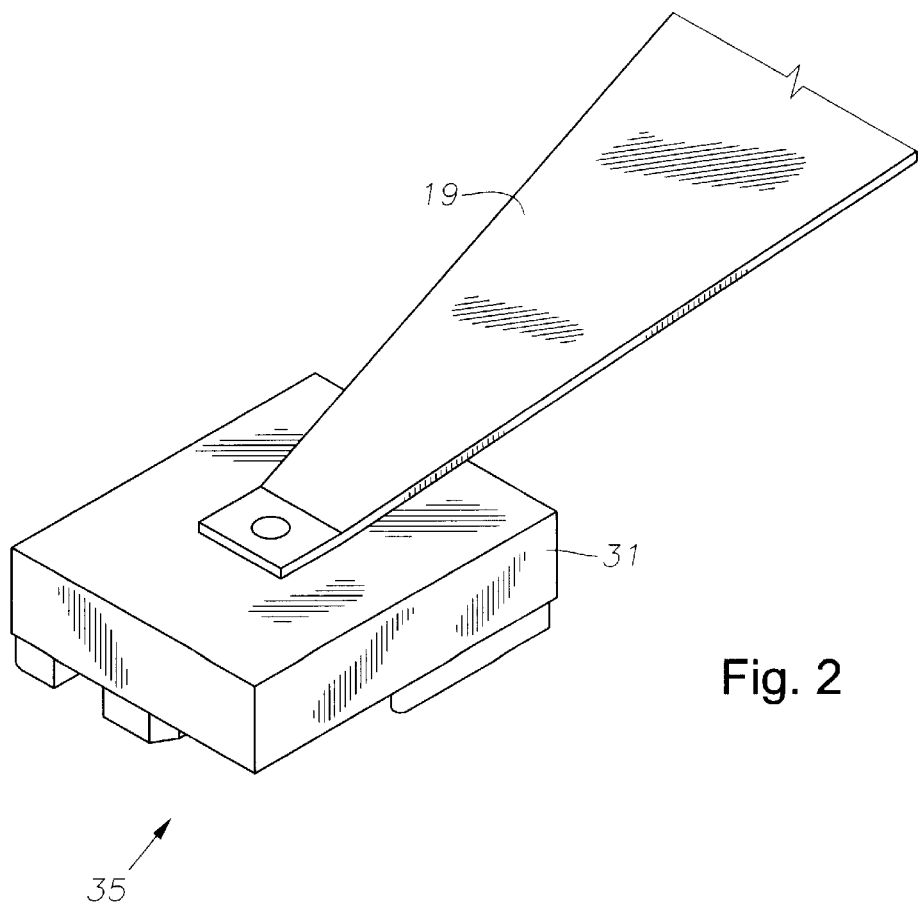
FIG. 2 is an enlarged isometric view of one embodiment of a head on the slider assembly of FIG. 1 and is constructed in accordance with the present invention.

As shown in FIG. 2, a slider, transducer, or flying head 31 having a read/write element is bonded to the end of suspension 19. In the embodiment shown, head 31 is pico size (approximately 1250×1000×300 microns) and formed from ceramic or intermetallic materials. Head 31 also may be nano size (approximately 2050×1600×450 microns), or femto size (approximately 850×700×230 microns). Head 31 is pre-loaded against the surface of disk 13 (preferably in the range two to ten grams) by suspension 19.

Figure 3:
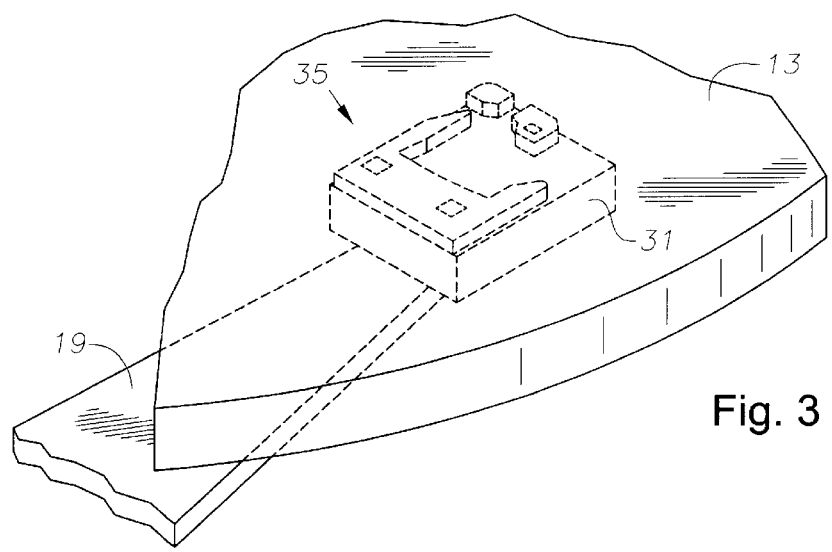
FIG. 3 is a schematic isometric drawing of the head of FIG. 2 inverted on a lower side of the disk of FIG. 1.
Figure 4:
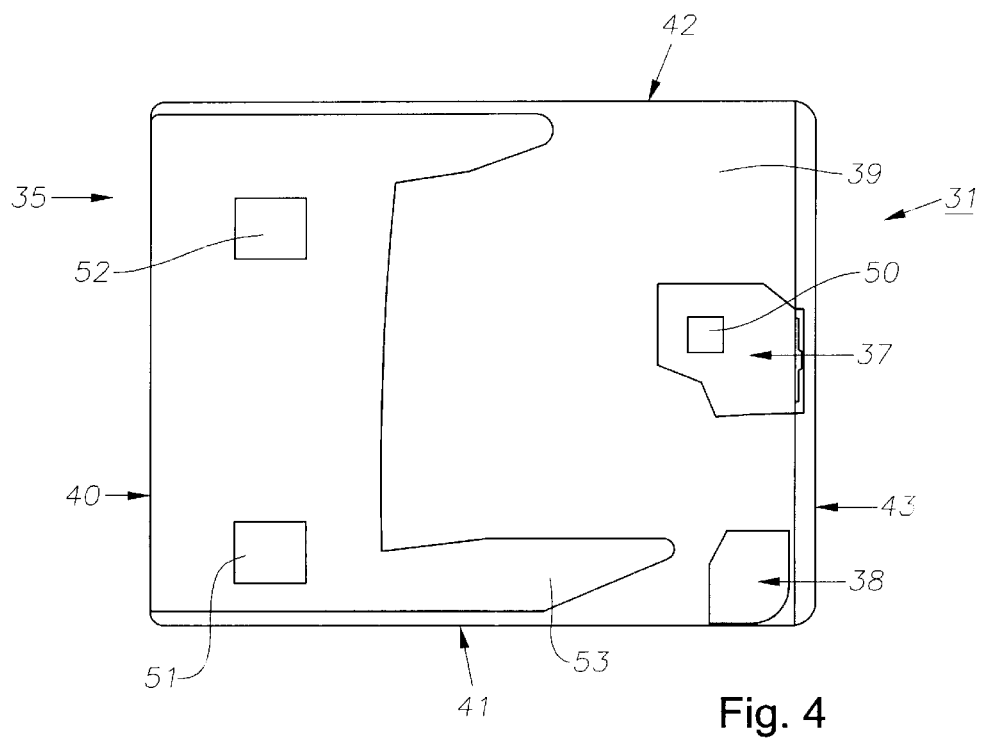
FIG. 4 is a bottom isometric view of the head of FIG. 2 showing an air bearing surface.

As shown in FIGS. 3 and 4, the air bearing 35 of head 31 comprises a patterned set of stepped elements, such as air bearing surface (ABS) pads 50, 51, 52, an offset ABS pad 38, which can have a height at the ABS surface (same height as the ABS pads) or below the ABS surface, shallow etch surfaces 37 and 53, and one irregularly-shaped, deep etch pocket 39. For reference purposes, a longitudinal direction is defined from left to right (FIG. 4), and a lateral direction is defined from top to bottom. Pocket 39 is manufactured using standard etching techniques such as reactive ion etching (RIE) and ion milling (IM), for example. Common etch depths range from about 0.1 to 5 microns. The ABS pads 50, 51, 52, or portions of the air bearing 35 that have not been etched, are also known as air bearing surfaces (ABS). In the embodiment shown, head 31 has three ABS pads 50, 51, 52, shallow etch surfaces 53, 37 (which are approximately 100 to 200 nm beneath the ABS pads), and one continuous but very irregular, deep etch pocket 39 (approximately 1.60 microns beneath the ABS pads) that extends to portions of the leading edge 40, lateral edges 41, 42, and trailing edge 43. Lateral edges 41, 42 also represent the inner and outer radial directions, respectively, of disk 13. The trailing edge 43 of air bearing 35 is defined by the rear edge of pocket 39, and the rear edges of surface 37. Each of the ABS are asymmetrical in both the longitudinal and lateral directions.

In a very general sense, pocket 39 has a U-type shape with thin strips extending between lateral edges 41 and 42. Leading etch surface 53 is generally C-shaped, having a rectangular main body and thin, elongated, trailing portions that are adjacent to lateral edges 41, 42, respectively.

Offset pad 38 is preferably smaller in surface area than shallow etch surfaces 53, 37, but is located at or adjacent to the corner defined by the intersection of lateral edge 41 and trailing edge 43. Note that the corner defined by the intersection of lateral edge 42 and trailing edge 43 has no offset pad, but only pocket 39, as all the ABS pads are spaced apart from the corner. In the preferred embodiment, head 31 is pico size. It should be apparent that the shape, location and etching depths of the various elements on air bearing 35 may be varied and are not necessarily limited to the slider size nor dimensions suggested above.

There are several important parameters-that measure the performance of head 31. Fly height is the separation between a point on the ABS and disk 13, such as the center of the trailing edge 43 of air bearing 35 and the surface of disk 13. Pitch is the tilting of the flying slider in the longitudinal direction with respect to the plane of the disk 13. Roll is the tilting of the flying slider in the transversal direction with respect to the plane of the disk 13. Fly height, pitch, and roll are all dependent on parameters like ambient pressure, temperature, air viscosity, linear velocity (product of radius from center of disk 13 and disk angular velocity or rpm), skew angle (angle between the longitudinal axis of head 31 and the tangent to the current radius from the center of disk 13), pre-load (the force applied by suspension 19), suspension moments (moments applied in the pitch and roll directions by suspension 19), slider flatness, and the design of air bearing 35 itself (described in the previous paragraphs). The design of head 31 targets a low velocity and low skew dependent, fly height profile that remains flat across the radius of disk 13. The spacing between head 31 and disk 13 is completely described by fly height, together with its pitch and roll.

The performance of head 31 may also be measured in terms of sensitivities. The sensitivities of head 31 describe its change in fly height, pitch, or roll when another parameter that affects the fly height changes by one unit. For example, "sensitivity to pre-load" measures the decrease in fly height when the pre-load force is increased by one gram. "Sensitivity to slider flatness" is also an important parameter. The surfaces 51, 52, 53 of air bearing 35 are not perfectly flat since head 31 exhibits a longitudinal curvature or crown, a transversal curvature or camber, and a cross curvature or twist. Among these features, crown has the greatest effect on fly height.

In general, the parameters that affect fly height are associated with the suspension 19 (pre-load, location of the dimple with respect to the slider, and static attitudes in the pitch and roll directions), head 31 (flatness and size of ABS 51, 52, 53, etch depths, mask alignment, and rail width), and operating conditions (ambient temperature, pressure, viscosity, and velocity). It is desirable for head 31 to have low sensitivities since that implies that the departure of fly height from its desired target is small. Each parameter affecting fly height is described statistically by its mean and standard deviation. A tight distribution of values for a parameter around their mean implies that the spread or standard deviation is small.

For example, "fly height sigma" is a statistical estimator of the fly height variation of a group of heads 31. This parameter is proportional to the standard deviation of other parameters that affect fly height, and to the sensitivities of the design of air bearing 35. Thus, by designing head 31 to possess low sensitivities, and by ensuring that the manufacturing process is very repeatable, a tight distribution of fly heights is realized.

There are also a number of specific requirements for head 31 that must be met. Since disk 13 is not perfectly flat and exhibits waviness or curvature that affects fly height, it is desirable that head 31 responds consistently to changes in the curvature of disk 13. There are at least two disk curvatures of interest. One is in the tangential direction is related to the crown of the slider. Another is in the radial direction and is related to the camber of the slider. Because of the magnitude of the radial curvature near the rim of the disk (also called roll-off or ski jump), it is important for the head 31 to feature a low transversal curvature sensitivity. The flatness sensitivity of head 31 is important in this respect.

Another requirement for head 31 is low fly height and roll sigmas. The variability in fly height of head 31 must be consistent. In particular, the roll standard deviation must be small since it is the spacing between the trailing edge 43 of head 31 and disk 13 that controls the fly height. If trailing edge 43 is perfectly parallel to disk 13, the clearance is uniform. Any amount of roll creates an uneven clearance between the head 31 and disk 13.

As a related requirement, head 31 must have good load/unload performance. During operation, head 31 is loaded onto a spinning disk 13 and must establish its supportive air bearing to avoid contact with disk 13. Ideally, there will be no exposure to contact during the load/unload sequences. However, physical contact with disk 13 is almost inevitable and can be a disturbing event on the fly height as it causes head 31 to lose support and cause damage to the disk 13.

Therefore, a robust and stable response to loading and unloading processes is provided by the absence of an ABS at the corner defined by the outer diameter lateral edge 42 and trailing edge 43 of head 31. During the unloading sequence, the presence of offset pad 38 and the lack of a similar structure in the other trailing corner of air bearing 35, slightly skews head 31 such that the probability of slider/disk contact with the inner diameter edge is reduced and contact with the outer diameter edge is increased. Offset pad 38 essentially forces head 31 to roll during load processes so that the likelihood of contacting disk 13 is much higher on the outer diameter side of head 31. Similarly (during unloading), pad 38 acts to bias the contact region to the outer diameter side of the slider. During the unloading sequence, the slider is lifted up away from the disk leading edge first. As the leading edge is pulled, pad 38 resists motion toward the disk surface due to pressurization at the pad. However, the outer diameter corner of the slider has less resistance since it does not have a pad similar to pad 38. This asymmetry causes the slider to roll during unloading processes so that the likelihood of contacting the disk 13 is much higher on the outer diameter side of head 31.

While the invention has been shown or described in only some of its forms, it should be apparent to those skilled in the art that it is not so limited, but is susceptible to various changes without departing from the scope of the invention. For example, if the slider/suspension assembly is parked at the inner diameter of the disk, the present invention may be implemented by locating the air bearing pads away from the corner of the air bearing defined by its inner radial edge and trailing edge.

What is claimed is:

1. A slider having a read/write element for reading and writing to a surface of a rotating disk, comprising:
   a base having a leading edge, a trailing edge, an inner edge, an outer edge, a trailing inner corner defined by an intersection between the trailing edge and the inner edge, and a trailing outer corner defined by an intersection between the trailing edge and the outer edge;
   an air bearing formed on the base and having a deep pocket formed at a pocket height relative to the base, shallow surfaces formed at a height that is greater than the pocket height, air bearing pads formed on the shallow surfaces at a pad height that is greater than the height of the shallow surfaces, the shallow surfaces comprising a leading shallow surface located adjacent to the leading edge, and a trailing shallow surface spaced apart from the leading shallow surface and located adjacent to the trailing edge;
   an additional pad spaced apart from the shallow surfaces and the air bearing pads and located adjacent to the wailing inner corner; and
   the air bearing being formed such that the trailing outer corner is completely free of the shallow surfaces, the air bearings pads, and the additional pad.

2. The slider of claim 1, wherein the additional pad is formed at a height that is equal to or less than the pad height, and the additional pad has a surface area that is greater than any one of the air bearing pads.

3. The slider of claim 1, wherein the deep pocket extends to the leading edge exclusively along lateral sides of the leading shallow surface adjacent to the inner and outer edges, and an entire length of the outer edge coincides with the deep pocket.

4. The slider of claim 1, wherein two of the air bearing pads are located on the leading shallow surface, one of the air bearing pads is located on the trailing shallow surface, and the additional pad is void of the air bearing pads.

5. The slider of claim 4, wherein one of the air bearing pads on the leading shallow surface is closer to the outer edge than the trailing shallow surface.

6. The slider of claim 4, wherein the air bearing pad on the trailing shallow surface is closer to the leading edge than the additional pad.

7. The slider of claim 1, wherein the leading shallow surface is generally C-shaped with inner and outer portions that extend along but are spaced apart from the inner and outer edges, respectively, with the inner portion having a length that is greater than a length of the outer portion.

8. The slider of claim 7, wherein the trailing shallow surface is closer to the leading edge than an end of the inner portion of the leading shallow surface.

9. The slider of claim 1, wherein the rear shallow surface is closer to the trailing edge than the additional pad.

10. The slider of claim 1, wherein the additional pad is closer to the inner edge than the leading shallow surface.

11. A slider having a read/write element for reading and writing to a surface of a rotating disk, comprising:
    a base having a leading edge, a trailing edge, an inner edge, an outer edge, a trailing inner corner defined by an intersection between the trailing edge and the inner edge, and a trailing outer corner defined by an intersection between the trailing edge and the outer edge;
    an air bearing formed on the base and having a deep pocket fanned at a pocket height relative to the base, shallow surfaces formed at a height that is greater than the pocket height, air bearing pads fanned on the shallow surfaces at a pad height that is greater than the height of the shallow surfaces, the shallow surfaces comprising a leading shallow surface located adjacent to the leading edge, and a trailing shallow surface spaced apart from the leading shallow surface and located adjacent to the trailing edge;
    an additional pad spaced apart from the shallow surfaces and the air bearing pads and located adjacent to the trailing inner corner, the additional pad being formed at a height that is equal to or less than the pad height, and the additional pad having a surface area that is greater than any one of the air bearing pads;
    the air bearing being formed such that the trailing outer corner is completely free of the shallow surfaces, the air bearings pacts, and the additional pad; wherein
    two of the air bearing pads are located on the leading shallow surface, one of the air bearing pads is located on the trailing shallow surface, and the additional pad is void of the air bearing pads; and wherein
    the leading shallow surface is generally C-shaped with inner and outer portions that extend along but are spaced apart from the inner and outer edges, respectively, with the inner portion having a length that is greater than a length of the outer portion.

12. The slider of claim 11, wherein the deep pocket extends to the leading edge exclusively along lateral sides of the leading shallow surface adjacent to the inner and outer edges, and an entire length of the outer edge coincides with the deep packet.

13. The slider of claim 11, wherein one of the air bearing pads on the leading shallow surface is closer to the outer edge than the trailing shallow surface.

14. The slider of claim 11, wherein the air bearing pad on the trailing shallow surface is closer to the leading edge than the additional pad.

15. The slider of claim 11, wherein the trailing shallow surface is closer to the leading edge than an end of the inner portion of the leading shallow surface.

16. The slider of claim 11, wherein the rear shallow surface is closer to the trailing edge than the additional pad.

17. The slider of claim 11, wherein the additional pad is closer to the inner edge than the leading shallow surface.

18. A slider having a read/write element for reading and writing to a surface of a rotating disk, comprising:

- a base having a leading edge, a trailing edge, an inner edge, an outer edge, a tailing inner corner defined by an intersection between the trailing edge and the inner edge, and a trailing outer corner defined by an intersection between the trailing edge and the outer edge;
- an air bearing formed on the base and having a deep pocket formed at a pocket height relative to the base, shallow surfaces formed at a height that is greater than the pocket height, air bearing pads formed on the shallow surfaces at a pad height that is greater than the height of the shallow surfaces, the shallow surfaces comprising a leading shallow surface located adjacent to the leading edge, and a trailing shallow surface spaced apart from the leading shallow surface and located adjacent to the trailing edge;
- the deep pocket extending to the leading edge exclusively along lateral sides of the leading shallow surface adjacent tote inner and outer edges, and an entire length of the outer edge coincides with the deep pocket;
- an additional pad spaced apart from the shallow surfaces and the air bearing pads and located adjacent to the trailing inner corner, the additional pad being formed at a height that is equal to or less than the pad height, the additional pad being closer to the inner edge than the leading shallow surface, the rear shallow surface is closer to the trailing edge than the additional pad, and the additional pad having a surface area that is greater than any one of the air bearing pads;

the air bearing being formed such that the trailing outer corner is completely free of the shallow surfaces, the air bearings pads, and the additional pad; wherein two of the air bearing pads are located on the leading shallow surface, one of the air bearing pads is located on the trailing shallow surface, and the additional pad is void of the air bearing pads, the air bearing pad on the trailing shallow surface being closer to the leading edge than the additional pad, and one of the air bearing pads on the leading shallow surface is closer to the outer edge than the trailing shallow surface; and wherein the leading shallow surface is generally C-shaped with inner and outer portions that extend along but are spaced apart from the inner and outer edges, respectively, with the inner portion having a length that is greater than a length of the outer portion, and the trailing shallow surface being closer to the leading edge than an end of the inner portion of the leading shallow surface.

* * * * *

UNITED STATES PATENT AND TRADEMARK OFFICE
CERTIFICATE OF CORRECTION

PATENT NO. : 6,574,074 B2
DATED : June 3, 2003
INVENTOR(S) : Bolasna et al.

It is certified that error appears in the above-identified patent and that said Letters Patent is hereby corrected as shown below:

Column 5,
Line 58, replace the word "wailing" with the word -- trailing --.

Column 6,
Line 35, replace the word "Fanned" with the word -- formed --.
Line 51, replace the word "pacts" with the word -- pads --.
Line 66, replace the word "packet" with the word -- pocket --.

Column 7,
Line 30, replace the word "tote" with the words -- to the --.

Signed and Sealed this

Seventh Day of October, 2003

JAMES E. ROGAN
*Director of the United States Patent and Trademark Office*